(12) United States Patent
Small et al.

(10) Patent No.: US 12,003,347 B2
(45) Date of Patent: Jun. 4, 2024

(54) SYSTEM AND METHOD FOR RETRIEVING DATA FROM A NON-NETWORKED, REMOTELY-LOCATED DATA GENERATING DEVICE

(71) Applicant: IDEXX Laboratories, Inc., Westbrook, ME (US)

(72) Inventors: Ryan Kenneth Small, Windham, ME (US); Andrew Charles Ahles, Pittston, ME (US); Nicholas Francis DiDomenico, Scarborough, ME (US)

(73) Assignee: IDEXX Laboratories, Inc., Westbrook, ME (US)

(\*) Notice: Subject to any disclaimer, the term of this patent is extended or adjusted under 35 U.S.C. 154(b) by 419 days.

(21) Appl. No.: 16/616,726

(22) PCT Filed: Jun. 14, 2018

(86) PCT No.: PCT/US2018/037464
§ 371 (c)(1),
(2) Date: Nov. 25, 2019

(87) PCT Pub. No.: WO2018/236658
PCT Pub. Date: Dec. 27, 2018

(65) Prior Publication Data
US 2020/0287748 A1 Sep. 10, 2020

Related U.S. Application Data

(60) Provisional application No. 62/522,235, filed on Jun. 20, 2017.

(51) Int. Cl.
*H04L 12/46* (2006.01)
*G06F 13/40* (2006.01)

(52) U.S. Cl.
CPC ...... *H04L 12/4625* (2013.01); *G06F 13/4068* (2013.01)

(58) Field of Classification Search
CPC ..... H04L 12/4625; H04L 45/00; H04L 49/00; G06F 13/4068; H04W 40/00
See application file for complete search history.

(56) References Cited

U.S. PATENT DOCUMENTS

| 6,446,192 B1 | 9/2002 | Narasimhan et al. ......... 712/29 |
| 8,254,409 B2 | 8/2012 | Breton et al. ................. 370/463 |

(Continued)

FOREIGN PATENT DOCUMENTS

| CN | 101668013 A | 3/2010 | ............ G06F 29/06 |
| CN | 102640465 A | 8/2012 | ............ H04L 12/56 |

(Continued)

OTHER PUBLICATIONS

The Notification Concerning Transmittal of International Preliminary Report on Patentability (Chapter I of the Patent Cooperation Treaty), dated Feb. 13, 2020, which was issued by the International Bureau of WIPO in Applicant's corresponding international PCT application having Serial No. PCT/US2018/037464, filed on Jun. 14, 2018.

(Continued)

*Primary Examiner* — Ian N Moore
*Assistant Examiner* — Latresa A McCallum
(74) *Attorney, Agent, or Firm* — Bodner & Bodner, PLLC; Christian P. Bodner; Gerald T. Bodner (57) ABSTRACT

A system and method for retrieving data from a data generating device includes a communication intermediary and an external data storage system. The communication intermediary has a first network interface that is connected to the external data storage system and a second network interface that is connected to the data generating device. The (Continued)

communication intermediary isolates the network communication between the data generating device and second network interface from the network communication between the external storage system and the first network interface, and thereby isolates the data generating device from the external storage system. The communication intermediary monitors the data generating device for newly generated data files, copies the newly generated data files to an internal memory and sends the data files to the external storage system.

3 Claims, 8 Drawing Sheets

(56) References Cited

U.S. PATENT DOCUMENTS

| | | | | |
|---|---|---|---|---|
| 8,473,651 | B1 | 6/2013 | Sundaravel | 710/62 |
| 8,514,856 | B1* | 8/2013 | Gai | H04L 49/602 |
| | | | | 726/1 |
| 9,049,240 | B2 | 6/2015 | Van De Poel | |
| 9,141,483 | B1* | 9/2015 | Sekar | H04L 67/563 |
| 9,467,449 | B2 | 10/2016 | Defrance et al. | |
| 2002/0032867 | A1 | 3/2002 | Kellum | 713/192 |
| 2006/0200570 | A1 | 9/2006 | Stirbu et al. | 709/230 |
| 2007/0162704 | A1* | 7/2007 | Xiao | G06F 16/9574 |
| | | | | 707/E17.12 |
| 2008/0282337 | A1* | 11/2008 | Crawford | H04L 65/102 |
| | | | | 726/14 |
| 2010/0177703 | A1 | 7/2010 | daCosta et al. | 370/328 |
| 2012/0311207 | A1 | 12/2012 | Powers et al. | 710/106 |
| 2013/0336216 | A1 | 12/2013 | daCosta et al. | 370/328 |
| 2014/0101728 | A1 | 4/2014 | DeFrance et al. | 726/4 |
| 2014/0173437 | A1* | 6/2014 | Pugh | G11B 27/034 |
| | | | | 715/723 |
| 2015/0032691 | A1* | 1/2015 | Hall | H04L 47/2466 |
| | | | | 707/610 |
| 2015/0195182 | A1 | 7/2015 | Mathur et al. | 714/27 |
| 2015/0282061 | A1* | 10/2015 | Matthews | G08B 25/004 |
| | | | | 455/404.1 |
| 2015/0350162 | A1 | 12/2015 | Crawford | 726/12 |
| 2015/0350326 | A1* | 12/2015 | Shetty | G06F 16/183 |
| | | | | 709/213 |
| 2015/0372870 | A1 | 12/2015 | Stiff | 370/338 |
| 2016/0099963 | A1* | 4/2016 | Mahaffey | G06F 21/554 |
| | | | | 726/25 |
| 2016/0134650 | A1 | 5/2016 | Farmer et al. | 726/23 |
| 2016/0182637 | A1 | 6/2016 | Adriaens et al. | 709/212 |
| 2017/0149890 | A1* | 5/2017 | Shamis | G06F 15/17331 |

FOREIGN PATENT DOCUMENTS

| | | | | |
|---|---|---|---|---|
| CN | 105393239 | A | 3/2016 | G06F 15/16 |
| JP | 2011523114 | A | 8/2011 | G06F 13/00 |
| JP | 2014075793 | A | 4/2014 | G06F 13/00 |
| JP | 3210462 | U | 5/2017 | G06F 13/00 |

OTHER PUBLICATIONS

The International Preliminary Report on Patentability (Chapter I of the Patent Cooperation Treaty), dated Feb. 4, 2020, which was issued by the International Bureau of WIPO in Applicant's corresponding international PCT application having Serial No. PCT/US2018/037464, filed on Jun. 14, 2018.

The Written Opinion of the International Searching Authority, dated Aug. 27, 2018, which was issued by the International Bureau of WIPO in Applicant's corresponding international PCT application having Serial No. PCT/US2018/037464, filed on Jun. 14, 2018.

The International Search Report, dated Aug. 27, 2018, which was issued by the International Bureau of WIPO in Applicant's corresponding international PCT application having Serial No. PCT/US2018/037464, filed on Jun. 14, 2018.

A Communication Pursuant to Rule 62 EPC, dated Mar. 12, 2021, issued by the European Patent Office in Applicant's corresponding European Patent Application No. 18820259.2, filed on Jan. 13, 2020.

A Supplementary European Search Report, dated Mar. 2, 2021, issued by the European Patent Office in Applicant's corresponding European Patent Application No. 18820259.2, filed on Jan. 13, 2020.

A Supplemental European Search Opinion (Mar. 12, 2021—mailed with the Communication Pursuant to Rule 62 EPC), issued by the European Patent Office in Applicant's corresponding European Patent Application No. 18820259.2, filed on Jan. 13, 2020.

An Office Action (in Japanese) and an English translation thereof, dated Jan. 18, 2022, issued by the Japanese Patent Office for Applicant's related apanese Patent Application No. JP 2019-570541, filed Dec. 19, 2019 (PCT international filing date Jun. 14, 2018).

An Examination Report, dated Apr. 13, 2023, issued by the Australian Patent Office for Applicant's related Australian Patent Application No. 2018288643, filed Dec. 3, 2019 (PCT international filing date Jun. 14, 2018).

An Office Action (in Chinese) and an English translation thereof, dated Sep. 5, 2022, issued by the China National Intellectual Property Administration or Applicant's corresponding Chinese Patent Application No. 201880041593.2.

A Communication Pursuant to Article 94(3) EPC, dated Aug. 30, 2022, issued by the European Patent Office in Applicant's corresponding European Patent Application No. 18820259.2.

An Office Action (in Japanese) and an English translation thereof, dated Oct. 25, 2022, issued by the Japanese Patent Office for Applicant's corresponding Japanese Patent Application No. 2019-570541.

An Office Action (in Chinese) and an English translation thereof, dated Oct. 23, 2023, issued by the China National Intellectual Property Administration for Applicant's related Chinese Patent Application No. 201880041593.2.

An Examination Report, dated Aug. 24, 2023, issued by the Australian Patent Office for Applicant's related Australian Patent Application No. 2018288643.

* cited by examiner

Example Configurations File 16

```
{
"dirMonitor": "DIR_MONITOR",
"dirArchive": "DIR_ARCHIVE",
"ignoreInitial": false,
"ignored": "*.exe",
"usePolling": true,
"interval": 10000,
"awaitWriteFinish": {
"stabilityThreshold": 2000,
"pollInterval": 100
},
"depth": 0, "sftp": {
"destination": "SFTP_DESTINATION",
"username": "SFTP_USERNAME",
"password": "SFTP_PASSWORD",
"host": "HOST_NAME",
"autoConfirm": true,
"protocol": "sftp",
"port": 22,
}
}
```

FIG. 8

SYSTEM AND METHOD FOR RETRIEVING DATA FROM A NON-NETWORKED, REMOTELY-LOCATED DATA GENERATING DEVICE

CROSS-REFERENCE TO RELATED APPLICATIONS

This application is related to U.S. Provisional Application Ser. No. 62/522,235, filed on Jun. 20, 2017, and entitled "System and Method for Retrieving Data From a Non-Networked, Remotely-Located Data Generating Device", the disclosure of which is incorporated herein by reference and on which priority is hereby claimed.

BACKGROUND OF THE INVENTION

Field of the Invention

The present invention generally relates to devices and methods for transferring data from test systems to external storage devices, and more specifically relates to systems and methods for transferring data from non-networked, isolated systems to networked systems.

Description of the Prior Art

Due to security concerns, test systems such as diagnostic analyzers are typically not networked (i.e., not connected to an external network or the internet). More specifically, one of the simplest methods of limiting test system vulnerability to malicious code (e.g., malware and viruses) is by eliminating a network/internet connection to the test system. Test system platforms that are networked (i.e., are connected to an external network or have an internet connection) typically require that the system run antivirus software to, at most, partially mitigate the risk of malicious code intrusions. Malicious code is ever evolving and, accordingly, antivirus software is becoming exceptionally complex, often requiring significant system resources to operate and routine updates. Accordingly, test system performance can be adversely impacted by the operation of antivirus software.

While eliminating a network/internet connection to the test system definitively mitigates the test system's vulnerability to malicious code, it also prohibits the employment of essential system tools that facilitate system efficiency. For example, the test system operating software cannot be updated remotely (i.e., via a remote connection) and, therefore, a technician or operator must be physically on site to connect to each individual test system. Additionally, the data generated by each test system cannot be transmitted to a remote device, such as a server or cloud based storage system. Furthermore, it is not possible to monitor the status and performance of the test system remotely. Accordingly, maintaining and operating test systems can be time consuming and inefficient.

OBJECTS AND SUMMARY OF THE INVENTION

It is an object of the present invention to provide a system for retrieving data from a data generating device that limits the device's vulnerability to malicious code.

It is another object of the present invention to provide a method for retrieving data from a data generating device that limits the device's vulnerability to malicious code.

It is yet a further object of the present invention to provide a method and system for retrieving data from a data generating device which eliminate the need to install and operate antivirus software on the device.

In accordance with one form of the present invention, a system for retrieving data from at least one data generating device is provided. The system includes a communication intermediary that interconnects at least one data generating device and an external data storage system. The communication intermediary includes a first network interface and a second network interface, the data generating device being in network communication with the second network interface and the external data storage system being in network communication with the first network interface. The communication intermediary isolates the network communication between data generating device and the second network interface from the network communication between the external data storage system and the first network interface, and thereby isolates the data generating device from the external data storage system. The system may further include an external control server having a user interface that monitors and controls the communication intermediary.

In another embodiment of the present invention, the system may retrieve data from a plurality of data generating devices and includes a plurality of communication intermediaries, each communication intermediary interconnecting a respective data generating device and the external data storage system. Alternatively, a single communication intermediary may interconnect with multiple data generating devices. The system also includes an external control server having a user interface that monitors and controls the plurality of communication intermediaries.

As stated previously, a method for retrieving data from a data generating device that limits the device's vulnerability to malicious code is also disclosed. The method includes the steps of connecting the communication intermediary between the data generating device and the external data storage system, configuring the communication intermediary to monitor the data generating device for newly generated data files, monitoring the data generating device for the generation of new data files and determining whether the data generating device has generated a new data file. Then, in accordance with the method of the present invention, upon the detection of a new data file, the communication intermediary duplicates the new data file and sends it to the external data storage system.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1:
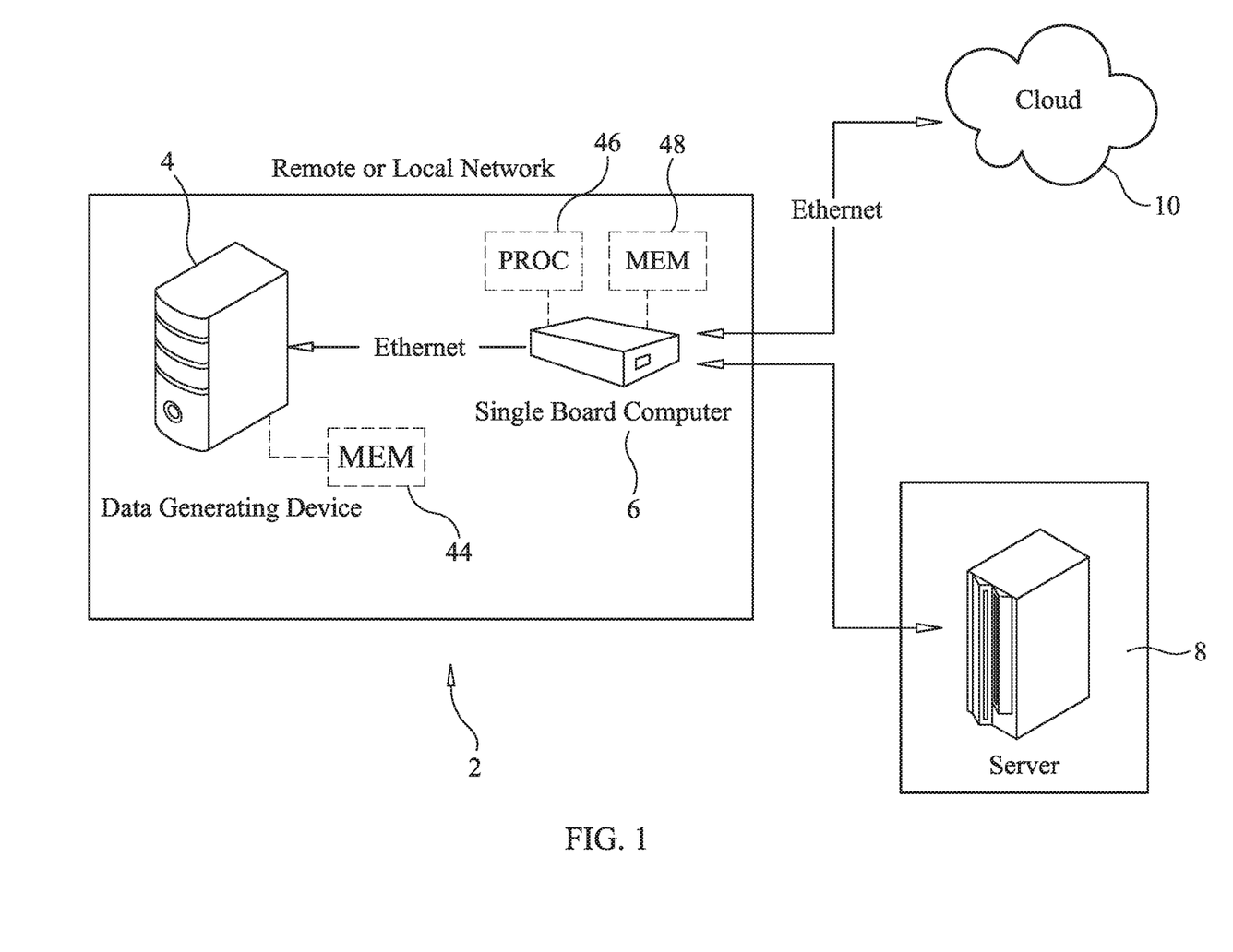
FIG. 1 is a block diagram illustrating an overview of the system of the present invention for retrieving data from a data generating device.
Figure 2:
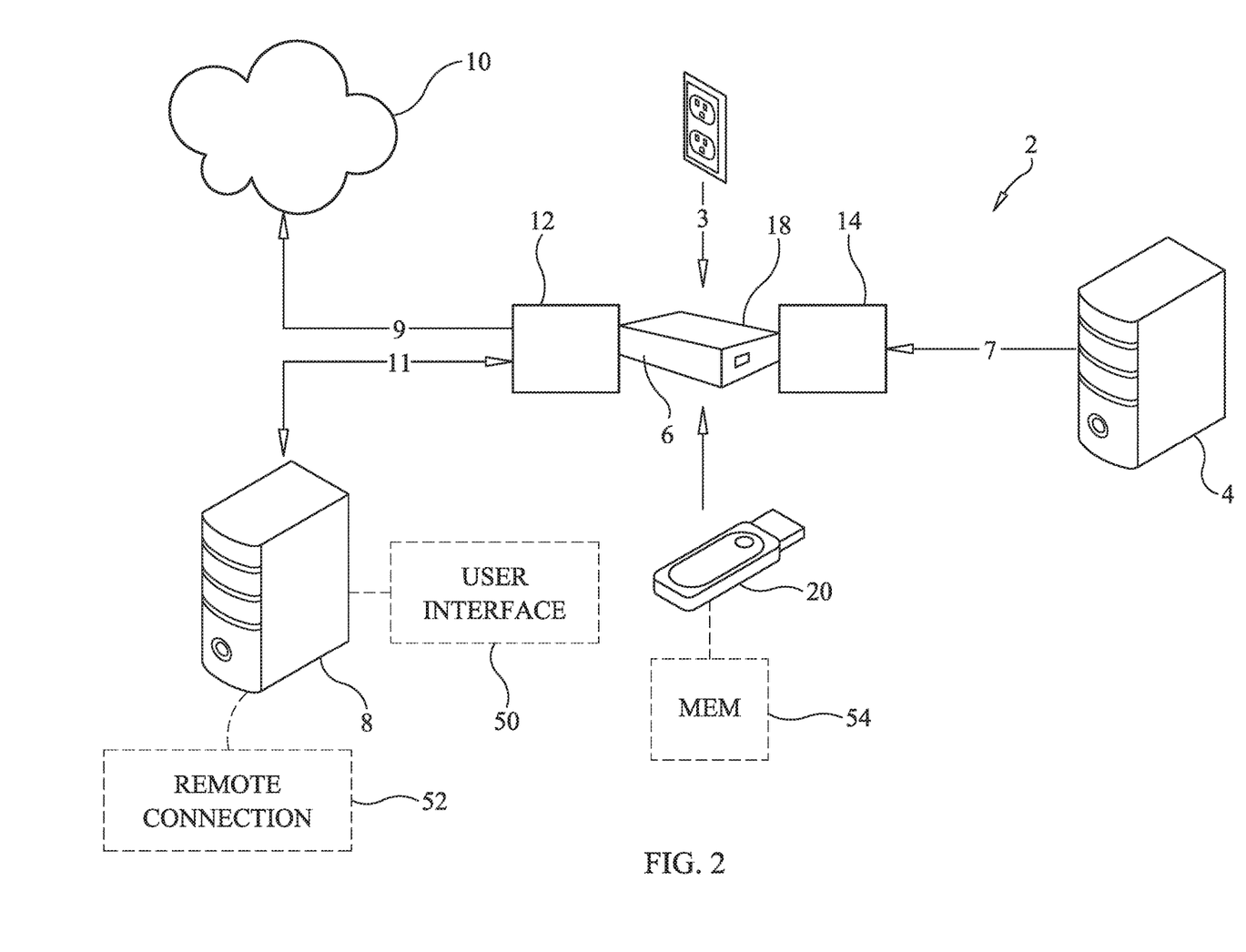
FIG. 2 is a block diagram of the system of the present invention, illustrating further components thereof.

Reference should initially be made to FIGS. 1 and 2 of the drawings, where it can be seen that a system 2 for retrieving data from a data generating device 4 formed in accordance with the present invention includes a communication intermediary 6 that is in communication with the data generating device 4, an external control server 8 and an external data storage system 10, shown in FIGS. 1 and 2 as a cloud. The communication intermediary 6 preferably includes at least one processor 46, at least one memory 48 in electrical communication with the processor 46, at least a first network interface 12 and a second network interface 14, the first network interface 12 and the second network interface 14 being in electrical communication with the processor 46. The network interfaces 12, 14 facilitate communication between the communication intermediary 6 and each of the data generating device 4, external control server 8 and external data storage system 10, and each may be configured as an Ethernet port, an adapter or a combination thereof. The communication between the first network interface 12 and each of the external control server 8 and the external data storage system 10 may be accomplished, for example, by a first Ethernet pathway 11 and a second Ethernet pathway 9, respectively. Similarly, the communication between the second network interface 14 and the data generating device 4 may be accomplished, for example, by a third Ethernet pathway 7. The system may also include a dedicated power supply 3, which is in electrical communication with the communication intermediary 6.

In a preferred embodiment of the present invention, the first network interface 12 and the second network interface 14 are configured as Ethernet ports; however, one or more of the first network interface 12 and the second network interface 14 may also be configured as a universal serial bus ("USB") port. Additionally, the communication intermediary 6 is preferably formed as a single board computer ("SBC"), such as a BeagleBone Black™ or Raspberry PI™ device. Furthermore, the external data storage system 10 is preferably formed as an external cloud storage system. The first network interface 12 is in communication with a networked system, which comprises the external control server 8 and the external cloud storage system 10, and the second network interface 14 is in communication with a non-networked system, which comprises the data generating device 4. An Ethernet cable, for example, may connect the first network interface 12 to the networked system and a USB-to-Ethernet cable adapter (or just an Ethernet cable) may connect the second network interface 14 to the non-networked system. As will be described in the forthcoming paragraphs, the SBC 6 isolates the non-networked system from the networked system so that the non-networked system has no means of communication with the networked system. The isolation of the non-networked system, comprising the data generating device 4, from the networked system, comprising the external control server 8 and the external cloud storage system 10, enhances the security and performance of the data generating device 4.

The data generating device 4, which is also referred to as a test system, target system or test fixture, routinely generates data files during operation. The data files may be stored in a directory within a memory 44 situated in the test system 4; however, the particular storage of the data files is handled by the server message block ("SMB") protocol. The test system 4 is configurable to share the data files stored in the directory of the memory 44 with the SBC 6 if certain credentials are provided. The address of the directory in the test system 4 where the data files are located is stored in a configuration file 16 (see FIG. 8) that is loaded into the memory 48 in the SBC 6. As will be described in greater detail, the SBC 6 monitors the test system directory and data files therein so that when a new test file is generated, a file transfer protocol can be initiated between the test system 4 and the SBC 6 so that the SBC 6 can send the data file to the external cloud storage system 10. The credentials in the configuration file are for the file transfer protocol. Upon detection of a new file, the system 2 uses the credentials to authenticate with the cloud. Credentials between SBC 6 and the test system 4 are only needed during the initial installation of the system 2 when exposing the directories and on system boot when mounting the directories.

In a preferred embodiment of the present invention, the SBC 6 includes an additional communication port 18 that is capable of receiving a removable memory storage device 20, such as a microSD card or a flash drive. The removable memory storage device 20 stores the configuration file 16 that is loaded into the memory 48 of the SBC 6 in an internal memory or storage 54 situated in the removable memory storage device 20. As described previously, the configuration file 16 includes information such as the address of the directory (i.e., the directory path) in the test system 4 where the data files are stored and the required credentials to upload data files to the cloud. The configuration file 16 may also include configuration information relative to the operation of the SBC 6, such as the frequency at which the SBC 6 polls the directory of the test system 4 for new files, as will be further explained in the forthcoming paragraphs. When the SBC 6 is initiated, the configuration file 16 stored in the removable memory storage device 20 is loaded into the memory 48 of the SBC 6 and the contents of the configuration file 16 are inserted into the program logic that runs on the SBC 6.

Figure 8:
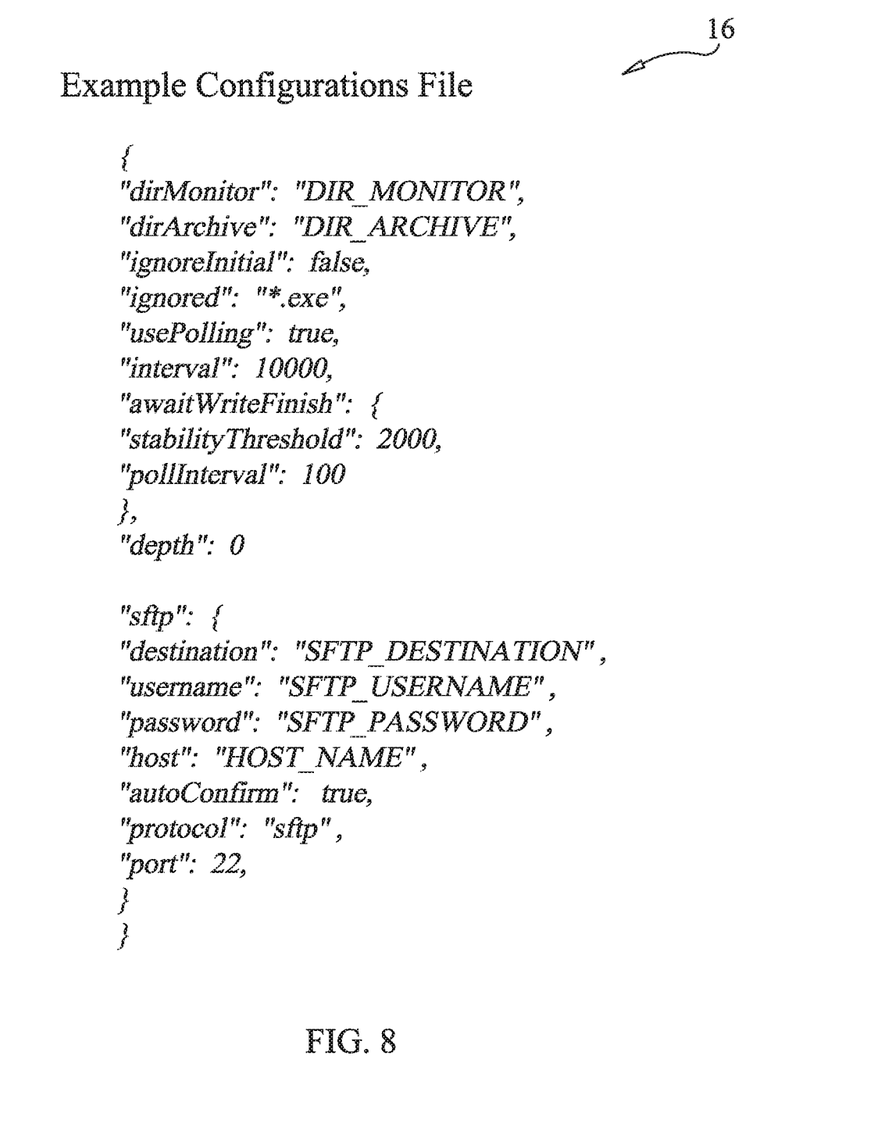
FIG. 8 is a code excerpt illustrating an exemplary configuration file.

An exemplary configuration file 16 is shown in FIG. 8 of the drawings. The configuration file 16 can be in a variety of formats; however, the exemplary configuration file 16 shown in FIG. 8 is in Java Script Object Notation ("JSON") format. Each key (e.g. "dirMonitor") is associated with a value (e.g. "DIR_MONITOR"). A description of various keys utilized in the exemplary configuration file 16 shown in FIG. 8 of the drawings is specified below:

dirMonitor: The directory or directories, on the target system 4, to monitor for new data. These directories are paths that need to be exposed on the target system 4 and mounted on the SBC 6. The target system 4 will write new data to these directories.

dirArchive: The directory, on the target system 4, where files will be moved to after they have been uploaded to the cloud 10. This directory is a path that needs to be exposed on the target system 4 and mounted on the SBC 6. It is optional to not have the files moved and archived if desired by business constraints.

ignoreInitial: A boolean flag indicating if files that are present in the monitored directories should be uploaded when the system 2 first starts up. If the flag is set to true, files in the monitored directory will be uploaded then archived as specified. This is helpful if the SBC 6 is turned off for a period of time and should dump files on startup that it had missed.

ignored: A collection of expressions that indicate which files should be ignored. For instance, if the target system 4 produces text files (.txt) and comma-delimited files (.csv), an expression of "*.txt" would only upload CSV files.

usePolling: A flag indicating if the SBC 6 should monitor for new data files using polling. A true value indicates that it will poll for new information; a false value indicates that it will depend on server message block ("SMB") protocol to notify of new file generation.

interval: The time in milliseconds that indicates how frequent polls should be. In this example, the SBC 6 will check for a new file every ten seconds. This value is only used if polling is enabled.

stabilityThreshold: The time in milliseconds that the SBC 6 should wait after detecting a file before uploading it. This is important because there are multiple parts to generating a file. The first part is the creation of a file. At this point in time a file size is effectively zero. Next, the system 2 will write to the file. Multiple writes may happen before the full contents of the file are written. If a poll happens just as a file has been created, but before the data has been fully written to the file, the SBC 6 could upload an empty or partial/corrupt file. During a poll, the file size is checked. After the elapsed time specified by this value, the file size is checked again. The file will be uploaded if the file size did not change, otherwise it will repeat the wait until no changes are detected. For example, after a new file has been detected it will be uploaded no sooner than two seconds, assuming the full content of the file was written within the ten second period.

pollInterval: The time in milliseconds to poll checking for a filesize change.

depth: Indicates how many layers of subdirectories should be monitored. A size of zero indicates that only files in the monitored directories will be uploaded and files generated in a subdirectory of a monitored directory will be ignored.

destination: The path to upload files to the external cloud storage system 10, which may be a Secure File Transfer Protocol ("SFTP") server.

username: The username to use for authenticating.

password: The password to use for authenticating.

host: The location of the SFTP server 10.

autoConfirm: Indicates if the SBC 6 should automatically accept the fingerprint of the host connection. A true value indicates that the confirmation will be accepted.

protocol: Indicates the protocol to use when uploading files.

port: The port to connect to the SFTP server 10.

These configurations are loaded each time the SBC 6 powers on and starts the program. The configurations for each SBC 6 can vary slightly, as some of the configurations include credentials for uploading the files and other unique settings. All of the SBCs 6 are identical. Thus, an SBC 6 can be replaced by simply moving the microSD card from the old SBC 6 into the new one.

Other configuration parameters not stored on the removable memory storage device 20 may be set during installation, such as the Target System IP address and the SBC IP address. The Target System IP address is the IP address that the SBC 6 will give the target system 4 (e.g., the test system or test fixture). This value is established when the SBC 6 is being installed and will generally be 192.168.222.50, for example. Keeping this consistent makes it a little easier to manage, but can be changed if it conflicts with its environment. This address is needed for mounting the monitored directories. The SBC IP address is the IP address for the second network interface 14 on the SBC 6 that connects to the target system 4. This value is established when the SBC 6 is being installed and will generally be 192.168.222.1, for example. This value is not explicitly used by any component of the system, but can help during setup for debugging.

Figure 4:
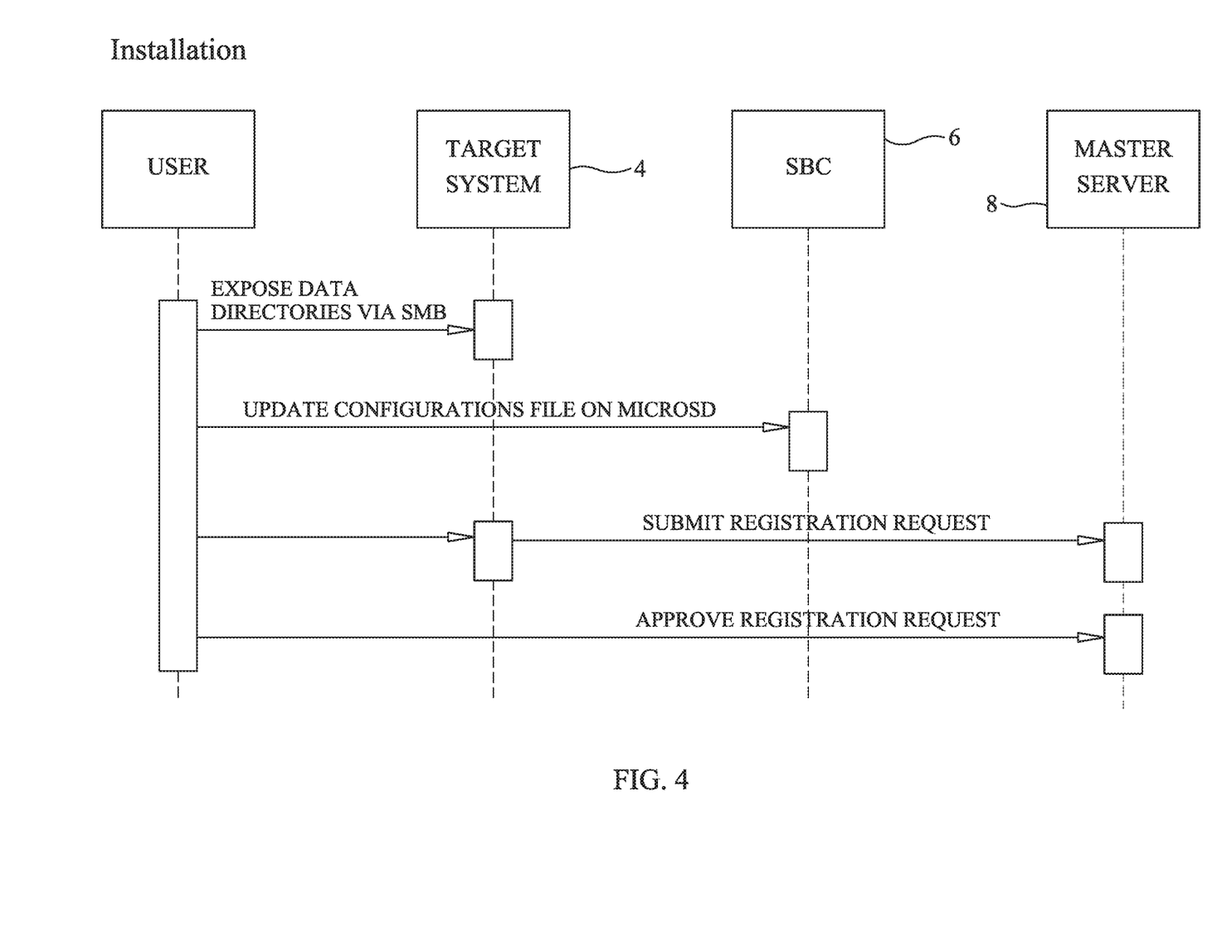
FIG. 4 is a sequence diagram (i.e., a combined block diagram and operational flow chart) of the system and method of the present invention for retrieving data from a data generating device, illustrating the installation of the system.
Figure 5:
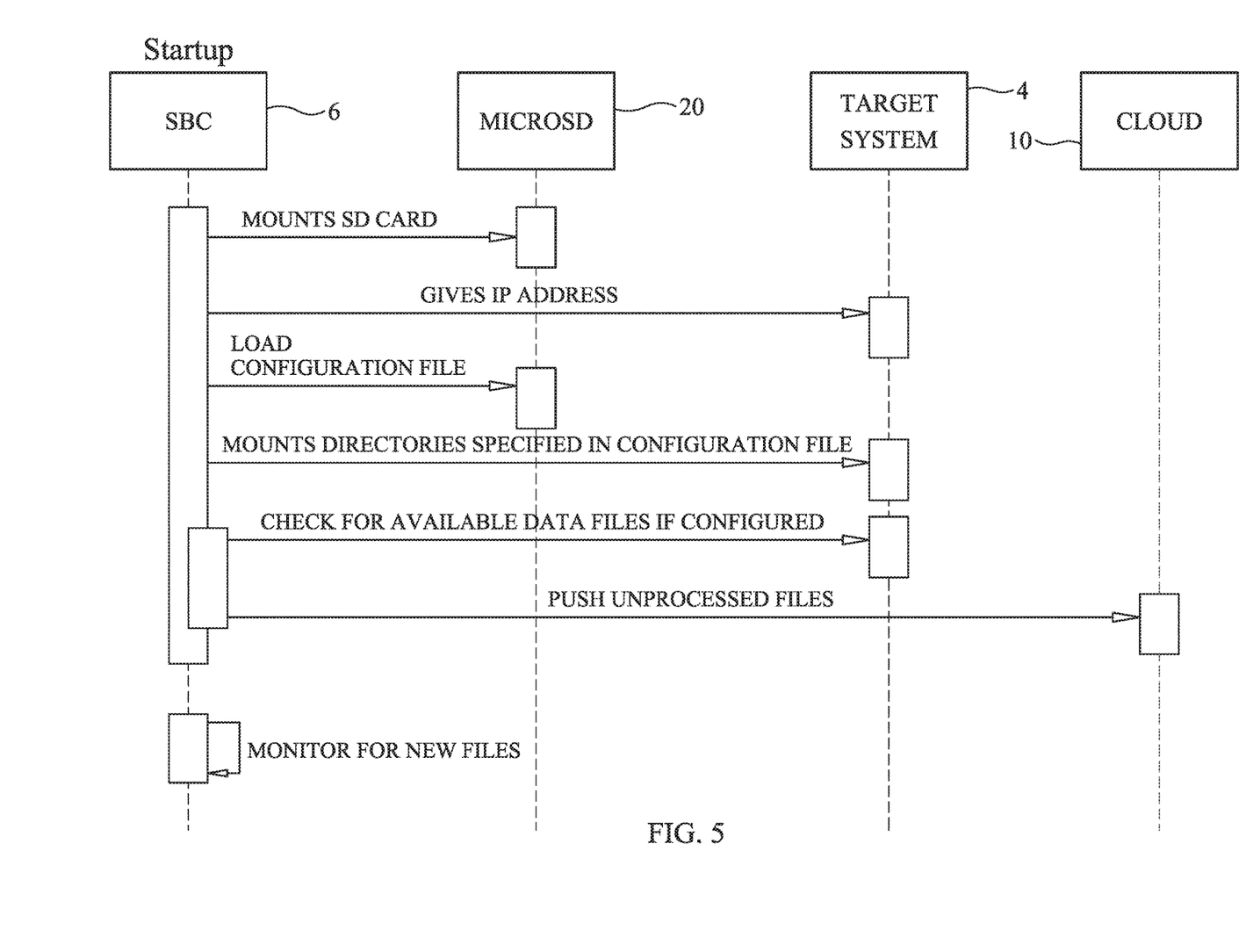
FIG. 5 is a sequence diagram (i.e., a combined block diagram and operational flow chart) of the system and method of the present invention for retrieving data from a data generating device, illustrating the startup of the system.
Figure 6:
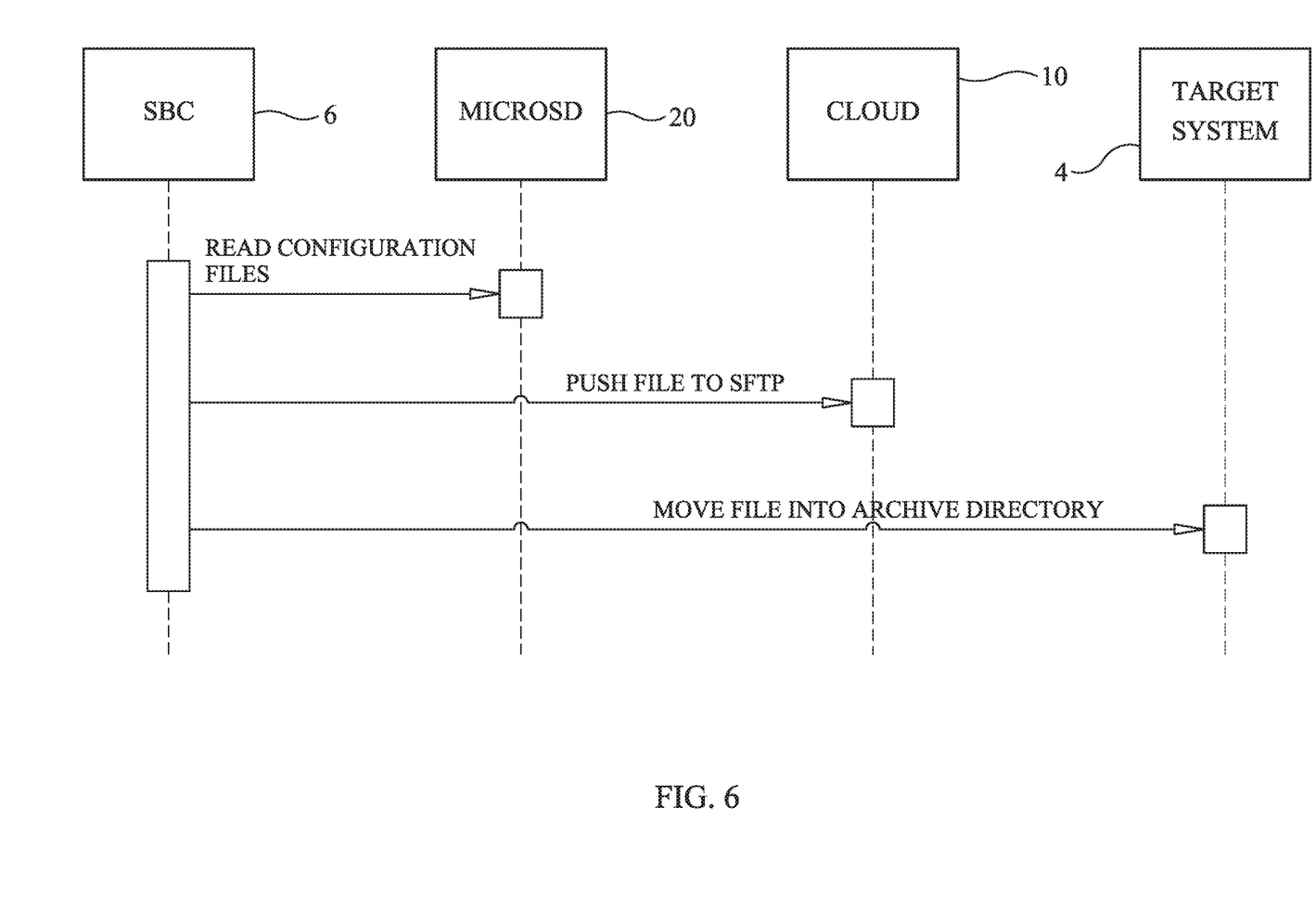
FIG. 6 is a sequence diagram (i.e., a combined block diagram and operational flow chart) of the system and method of the present invention for retrieving data from a data generating device, illustrating methodology that follows the detection of a new data file.

The preferred installation and start-up procedure for the system 2 are respectively shown in the combined block diagrams and operational flow charts of FIGS. 4 and 5. It should be noted that the directories on the test system 4 should be exposed for the SBC 6 to mount the directories, and this exposure should be maintained for the SBC 6 to keep the directories mounted. The registration process between the server 8 and the SBC 6 is preferably performed during installation. The registration process and directory mounting are independent and can be done in either order, although it is preferred to perform the registration process last for consistency.

Figure 7:
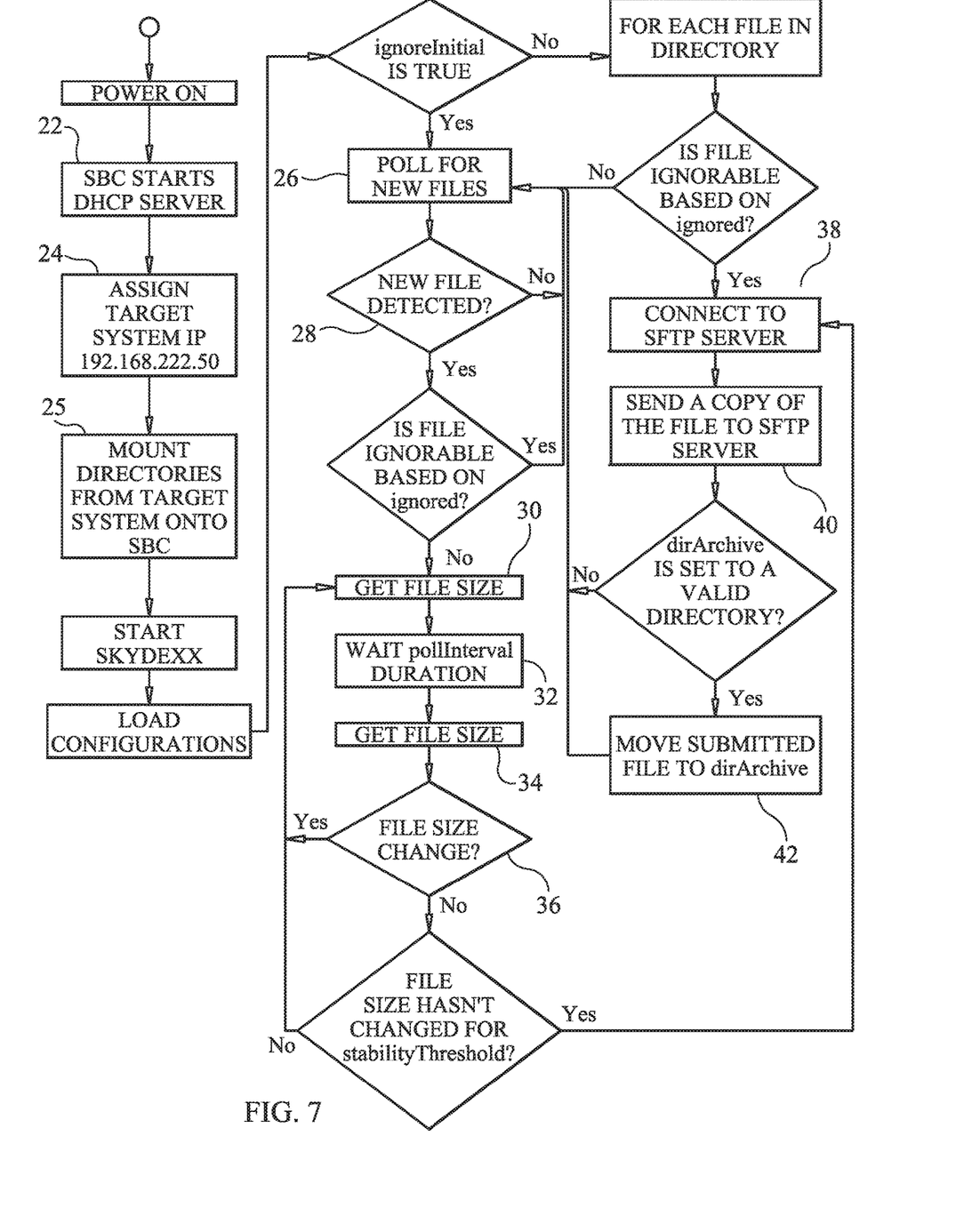
FIG. 7 is a flow chart illustrating the operation of the system for retrieving data from a data generating device of the present invention.

The SBC 6 acts as a dynamic host configuration protocol (DHCP) server and provides an IP address to the test system 4. More specifically, the SBC 6 runs a version of Linux. It uses a DHCP package to handle this. An SMB package is also preferably used to handle the directory mounting. Referring to FIG. 7 of the drawings, which shows an operational flow chart of the system 2 formed in accordance with the present invention, when the SBC 6 detects that the test system 4 is connected to the second network interface 14, the SBC 6 starts the DHCP server (Step 22) and generates and assigns an IP address to the test system 4 (Step 24). After the SBC 6 provides the test system 4 with the known, isolated IP address, the SBC 6 utilizes the credentials and directory path specified in the configuration file 16 to mount the directory from the test system 4 onto the SBC 6 (Step 25). This step (Step 25), MOUNT DIRECTORIES FROM TARGET SYSTEM ONTO SBC, happens at the system level and not the application level. This step, and those before it, preferably are manually executed by a technician during the install phase, and so these steps happen only once. Furthermore, mounting these directories creates a folder on the SBC 6. The configuration files reference these local directories and not the directories on the fixture 4. In response, the test system 4 exposes the directory and data files therein by SMB protocol and the directory is mirrored on the SBC 6. The SBC 6 monitors the directory, using SMB protocol, for the generation of a new data file (Step 26).

The SBC 6 can monitor the directory for new data in a variety of ways. One exemplary method of determining when a new data file has been generated is shown in the operational flowchart illustrated in FIG. 7 of the drawings. Generally, the SBC 6 polls the directory of the data generating device 4 at a specific frequency or periodicity (e.g., every ten seconds) (Step 26), as specified in the configuration file 16. When a new data file is detected (Step 28), the SBC 6 determines whether the test system 4 has completed writing the new data file. More specifically, the SBC 6 monitors the size of the new data file (Steps 30-34) periodically (e.g., every two seconds) to determine whether the file size has changed (Step 36). If the file size has changed, the SBC 6 checks again after a second period of time (e.g., two seconds). When the SBC 6 determines that there has been no change in the file size, which is indicative that the generation of the new data file by the test system 4 is complete, the SBC 6 connects to the external cloud storage system 10 in communication with the first network interface 12 (Step 38) and sends a copy of the data file thereto (Step 40).

More specifically, the external cloud storage system 10 is preferably configured as a Secure File Transfer Protocol ("SFTP") server; however, the external cloud storage system 10 may also be configured as a STP server, an Amazon file storage server or any type of external storage server. As discussed previously with regard to the contents of the exemplary configuration file 16, the location of the external cloud storage system 10, the path (i.e., directory) to upload the files to on the external cloud storage system 10 and the credentials required to access the SFTP server are stored in the configuration file 16 on the removable memory storage device 20. To connect to the SFTP server 10, the SBC program logic communicates the required credentials specified in the configuration file 16. The SBC 6 then writes a copy of the data file on the SFTP server in the directory specified in the configuration file 16.

After the new data file has been written to the SFTP server 10, the test system 4 optionally moves the data file to an archived directory (Step 42). Thereafter, the SBC 6 returns to monitoring the test system 4 for new files (Step 26) and repetitively writes any new data files to the SFTP server 10 (Step 40).

For additional security, the SBC 6 can be configured to disable the connection between the first network interface 12 and the networked system until the data file is ready to be transmitted. Accordingly, the SBC 6 will only be networked during the data transmission phase. However, networking tools, both malicious and benign, will be unable to detect the SBC 6 during such idle times. The connection to the cloud 9 is created (along with authentication) when a new file is ready to be uploaded. After uploading, the connection is terminated (i.e., each file creates a new connection).

The external control server 8 is configured to track and monitor the SBC 6. The SBC 6 automatically registers itself with the external control server 8. The registration process authenticates communication between the server 8 and the SBC 6 and allows the server 8 to send commands to be executed on the SBC 6. This authentication is performed during the initial install process, and ensures that all devices (SBCs 6) are legitimate. This allows for remote access and control of the SBC 6. The external control server 8 can report on the status of any registered SBC 6. The functionality does require that the SBC 6 not turn the first network interface 12 off. The external control server 8 further includes a remote connection 52 that allows a user to connect to the external control server 8 remotely. Furthermore, the external control server 8 also includes a user interface 50 that facilities user operation thereof.

Figure 3:
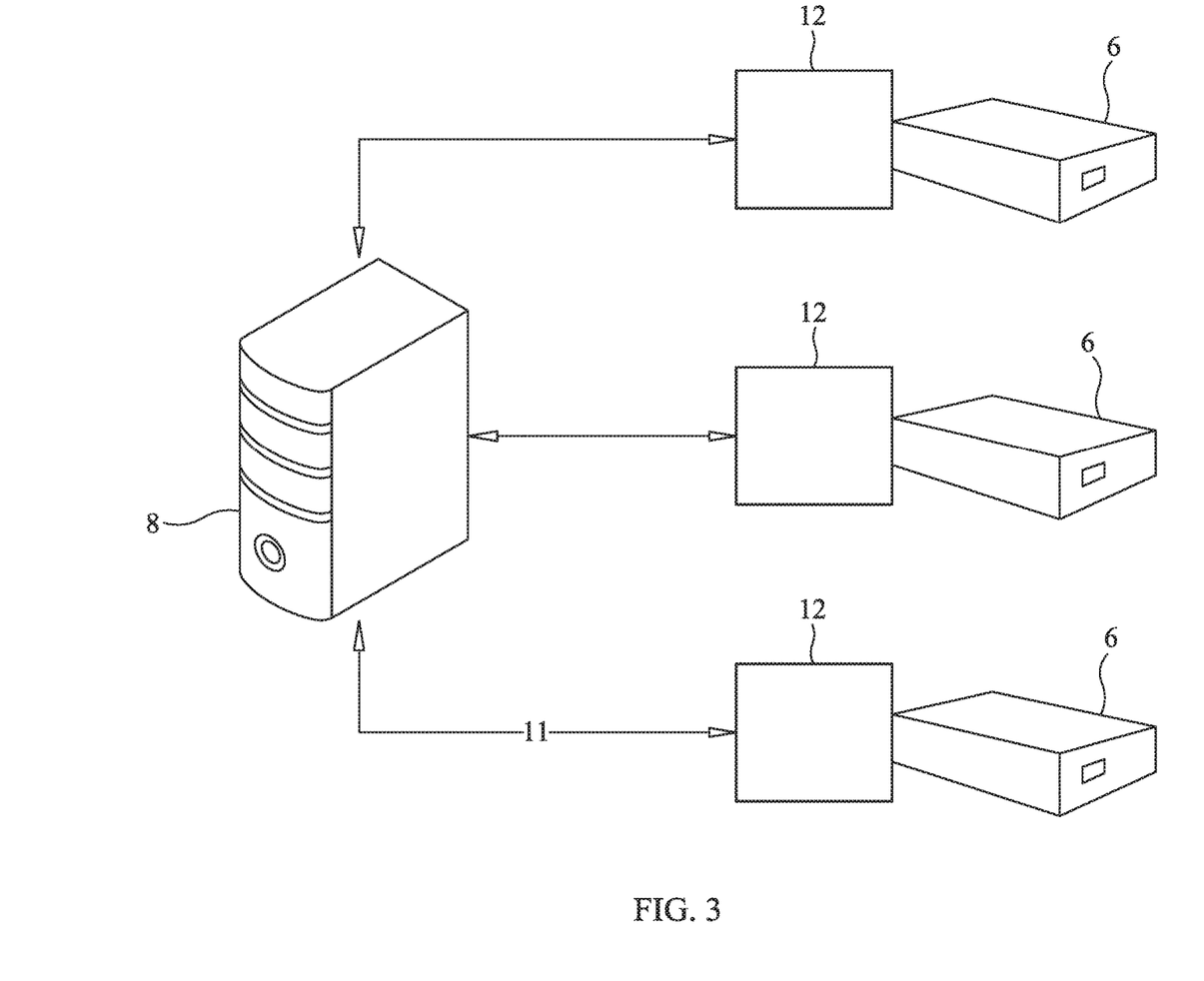
FIG. 3 is a block diagram illustrating an overview of the system of the present invention for retrieving data from a plurality of data generating devices by utilizing a plurality of communication intermediaries.

In yet another embodiment of the present invention, the external control server 8 may be configured to control a plurality of SBCs 6 and test systems 4. More specifically, as shown in FIG. 3 of the drawings, a plurality of SBCs 6 may be connected to the external control server 8 through each SBC's first network interface 12. The second network interface 14 of each SBC 6 is in communication with a respective test system 4. The external control server 8 is configured to operate as a dashboard for all of the SBCs 6 so that a user may log in to the external control server 8 to control each individual SBC 6. For example, the external control server 8 may instruct one or a plurality of SBCs 6 to reboot. Similarly, the external control server 8 can instruct one or more of the SBCs 6 to upgrade their operating software and, therefore, can accomplish a bulk installation of software on all of the SBCs 6. Furthermore, the external control server 8 can command one or more of the SBCs 6 to give operational status updates of the SBCs 6 so that an operator may detect and query non-operating SBCs 6. As in the previous embodiments, each SBC 6 continues to communicate data files to the external cloud storage system 10. The configuration files 16 for each SBC 6 may specify a particular directory in the cloud system 10 into which a data file may be written.

There is preferably no two-way communication between the external server 8 and the test system (i.e., the data generating device 4). The server 8 can send commands to the SBC 6 to upgrade and perform other routines. Nevertheless, the SBC 6 and the test system 4 communicate via the Server Message Block (SMB) protocol. This is the protocol used to mount the exposed directories on the test system 4 onto the SBC 6. Outside of any two-way communication in this protocol, for all intents and purposes, there is preferably no other two-way communication between the test system 4 and the SBC 6. The test system 4 does not know what is being done with the data. Moreover, preferably, the test system 4 is not able to distinguish between the SBC 6 and any other potential agent using SMB. As just mentioned, any two-way communication would be internal to the SMB (Server Message Block) protocol.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method for retrieving data from a plurality of data generating devices, each data generating device of the plurality of data generating devices having at least one memory, each of the data generating devices generating data files and storing the data files in the memory of the data generating device, the method being performed by a system comprising a plurality of communication intermediaries, each of the communication intermediaries having at least one processor, at least one memory in electrical communication with the processor, at least a first network interface and a second network interface, the first network interface and the second network interface being in electrical communication with the processor, each of the data generating devices being in network communication with the second network interface of a respective communication intermediary, the system further comprising an external data storage system, the external data storage system being in network communication with the first network interface of each of the communication intermediaries, and an external control server, the external control server being in network communication with the first network interface of each of the communication intermediaries, wherein each communication intermediary isolates the network communication between the communication intermediary's respective data generating device and the second network interface of the communication intermediary from the network communication between the external data storage system and the first network interface, and thereby isolates the communication intermediary's respective data generating device from the external data storage system, the method comprising the steps of:

connecting each communication intermediary between one of the data generating devices and the external data storage system;

configuring each communication intermediary to monitor the communication intermediary's respective data generating device for the generation of new data files;

monitoring the data generating devices with each data generating device's respective communication intermediary for the generation of the new data files;

determining with each communication intermediary whether a new data file has been generated by each communication intermediary's respective data generating device;

copying the new data file generated by each data generating device onto the data generating device's respective communication intermediary; and     sending the copy of the new data file generated by each data generating device from the data generating device's respective communication intermediary to the external data storage system.

2. The method as defined by claim 1, wherein the system includes a plurality of removable memory storage devices, each of the removable memory storage devices having at least one memory in which system configuration information is stored, wherein each of the communication intermediaries includes a removable memory storage device receptacle, each of the removable memory storage device receptacles being in electrical communication with the processor of the respective communication intermediary, each of the removable memory storage device receptacles receiving and being in electrical communication with one of the removable memory storage devices, wherein the step of configuring each communication intermediary to monitor the communication intermediary's respective data generating device for the generation of new data files includes the sub-steps of:

inserting the removable memory storage devices into the removable memory storage device receptacles of respective communication intermediaries; and     loading the configuration information from each of the removable memory storage devices onto the respective communication intermediaries.

3. The method as defined by claim 2, wherein the memory of each of the data generating devices includes at least one directory into which the generated data files are stored, wherein the step of monitoring the data generating devices for the generation of new data files includes the sub-step of:

mounting the directory of each data generating device where the data files are stored onto the data generating device's respective communication intermediary.

\* \* \* \* \*